J. LARDOS.
VEHICLE WHEEL TIRE.
APPLICATION FILED JAN. 2, 1919.
1,372,887.
Patented Mar. 29, 1921.
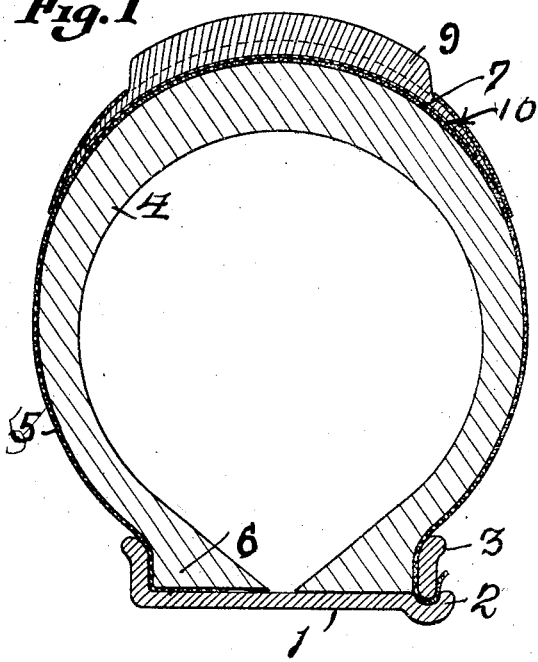
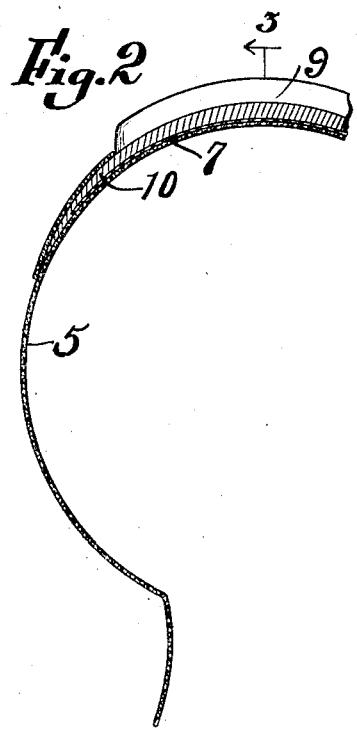
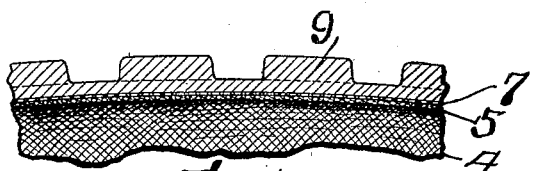
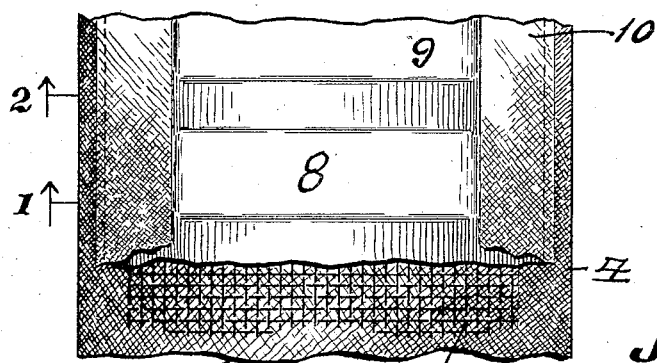
INVENTOR-
John Lardos,
By C. E. Humphrey
ATTORNEY.

UNITED STATES PATENT OFFICE.

JOHN LARDOS, OF AKRON, OHIO.

VEHICLE-WHEEL TIRE.

1,372,887.

Specification of Letters Patent.  Patented Mar. 29, 1921.

Application filed January 2, 1919. Serial No. 269,371.

*To all whom it may concern:*

Be it known that I, JOHN LARDOS, a subject of Greece, residing at Akron, in the county of Summit and State of Ohio, have invented new and useful Improvements in Vehicle-Wheel Tires, of which the following is a specification.

This invention relates to a detachable covering, sheath or envelop for elastic tires and is primarily designed for use in connection with pneumatic tires.

The object of the invention is to provide a sheath or covering which may be placed over the tire for protecting the same against puncture and which is provided with means to prevent skidding and also to increase the tractive properties of the tire when the covering is in place thereon.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1 is a transverse sectional view of the rim portion of a vehicle wheel, showing a pneumatic tire mounted thereon and my improved covering in operative relation with respect to the tire, the section being taken approximately on line 1 of Fig. 4.

Fig. 2 is a fragmentary sectional view of the device shown in Fig. 1 taken approximately on line 2 of Fig. 4.

Fig. 3 is a longitudinal sectional view of a portion of the device shown in Fig. 1 taken approximately on line 3 of Fig. 2, and Fig. 4 is a plan view of a portion of the device shown in Fig. 1 with portions thereof broken away to better illustrate the same.

Referring to the drawings in detail the reference numeral 1 denotes a vehicle rim provided with an offset 2 at one side and containing a circumferential channel in which is seated a tire retaining ring 3, the tire rim being of conventional form. Mounted on the rim is a pneumatic tire 4.

The device which forms the subject matter of the present invention comprises a sheath, covering or envelop which is arranged to be positioned around the tire 4 and protect the same and to increase the tractive qualities thereof and also to prevent skidding of the car when the device is in use. The invention embodies a layer 5 which entirely envelops the tire 4 and with the inner separated edges thereof secured under the bead portion 6 of the tire and held in place by said bead when the tire is inflated and preferably secured on the opposite side under the locking ring 3 as shown in Fig. 1. The outer tread forming portion of the member 5 is covered by a layer 7 of foraminous or reticulated material such as wire cloth 7 which is preferably vulcanized to the layer 5 during the building up of the device. Mounted on the layer 5 and covering the layer 7 is a strip 8 of rubber, preferably crescent-shaped in cross section and provided with a series of regularly recurring projections 9, these projections being in the form of ribs for adding to the tractive properties of the tire and as they are arranged in spaced relation the spaces between them afford means for entrance of the material of the roadway and also to prevent skidding of the same. The side portions of the member 8 are gradually sloped down or inclined and are secured by vulcanization to the member 5 covering the lateral portions of the layer 7 thereby securing the layer 7 in position and preventing exposure of the same to the elements. The joints between the lateral portions of the member 8 and the member 5 are covered by circumferentially extending strips 10 preferably formed of rubber saturated fabric which when the entire device is vulcanized unite with the members 8 and 5 to form the entire device into a unitary product. By the use of this device the entire tire is protected against injury and increased tractive qualities are developed and at the same time the vehicle on which a tire equipped with this device is less likely to skid due to the transverse ribs 9. The layer 7 of foraminous or reticulated material assists in preventing puncture of the tire and also stiffens the general structure of the same.

I claim,

As a new article of manufacture, a covering for inclosing a tire, said covering including a fabric sheath anchored adjacent the tire beads, a layer of reticulated material applied over the tread portion of the sheath and vulcanized thereto, a strip of rubber crescent-shaped in cross-section mounted on the reticulated material with the side edges thereof extending laterally of the reticulated material and vulcanized to the fabric sheath to cover the reticulated material and circumferentially extending strips vulcanized to the opposite edges of the crescent-shaped rubber strip and the fabric sheath and overlying the side edges of the strip of rubber.

In testimony whereof I have hereunto set my hand.

JOHN LARDOS.